Figure 1:
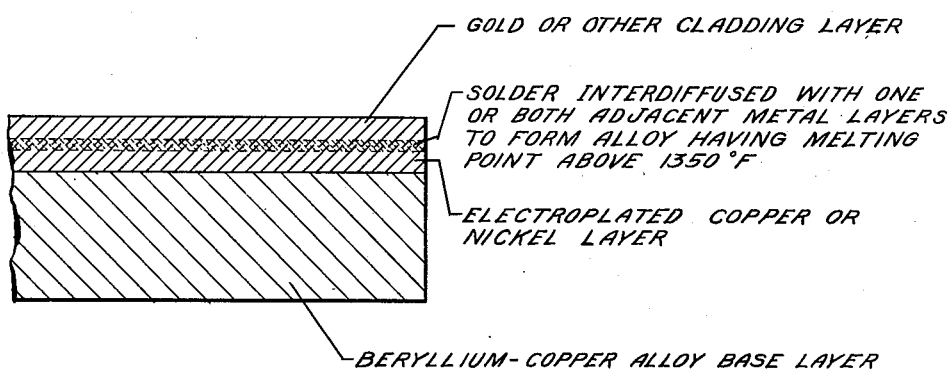

Sept. 2, 1952  V. G. MOORADIAN  2,608,753
CLAD BERYLLIUM-COPPER ALLOYS
Filed May 24, 1947

INVENTOR.
Victor G. Mooradian
BY
ATTORNEYS

Patented Sept. 2, 1952

2,608,753

UNITED STATES PATENT OFFICE 2,608,753

CLAD BERYLLIUM-COPPER ALLOYS

Victor G. Mooradian, East Orange, N. J., assignor to The H. A. Wilson Company, Newark, N. J., a corporation of New Jersey Application May 24, 1947, Serial No. 750,359

21 Claims. (Cl. 29—199)

This invention relates to the manufacture of clad beryllium-copper alloys, such, for example, as precious-metal-clad beryllium-copper alloys. The invention is also applicable to the manufacture of a bimetal comprising a layer of beryllium-copper. The terms "bimetal" and "clad metal" are to some extent used interchangeably in this application, although the term "bimetal" is generally used in the trade to denote metal products composed of two layers of different metal compositions but approximately equal thicknesses; whereas the term "clad" metal generally is used to denote composite metal products in which the surface layer, of one composition, is substantially thinner than the base layer of a different composition.

Clad metals and bimetals generally are made by soldering, brazing or welding together sheets or bars of the two or more different metals of which the product is to be composed, and rolling the resulting assembly to the desired thickness. The manufacture of such conventional bimetals as brass-"Invar" thermostatic metal, and clad metals such as silver-clad or gold-clad copper and steel, presents no serious problems to modern technology. Two or more bars of the different metals, or a relatively thin sheet of one and a bar of the other, are usually brazed or silver-soldered together by well-known soldering or brazing procedures, and the resulting brazed or soldered assembly is then rolled to the desired thickness.

The manufacture of bimetal or clad metal products having one layer composed of a beryllium-copper alloy has, on the other hand, proven very difficult. In fact, it has not heretofore been possible to produce commercially, and with an economically low percentage of rejected material, a bimetal or clad metal product having a beryllium-copper alloy as a major constituent. The difficulty arises in part from the nature of the heat treatment to which it is desirable to subject the beryllium-copper alloy and the need for producing a bond between the beryllium-copper and cladding metal that is exceptionally tenacious in order to withstand the rigors of this heat treatment; and in part from the fact that the refractory beryllium oxide that is always present at the surface of a beryllium-copper alloy bar interferes with making even a moderately strong brazed or solder joint.

The chief advantage of the ordinary beryllium-copper alloys is that they may be annealed to a soft condition in which they may be worked readily by mechanical means, and then may be precipitation-hardened by heat treatment to develop a high degree of mechanical strength and excellent spring properties. Annealing of the alloy to render it soft enough for easy mechanical working generally involves heating the alloy at a temperature in the range from 1275° F. to 1475° F., for a period of time long enough for the beryllium to go into solid solution in the copper, and then rapidly cooling the alloy to near room temperature to hold the beryllium in solid solution. Hardening of the annealed alloy is effected by reheating at a temperature from 500° F. to 700° F. for a considerable period of time—long enough to permit the beryllium to percipitate from solid solution—and then cooling.

It is evident from the foregoing that to secure the advantages obtainable by heat treatment of the beryllium-copper in a clad metal product having a layer of this alloy, the bond between the beryllium-copper and the cladding metal must hold firmly at the solution-anneal temperature (in the range from 1275° F. to 1475° F. and for best results between 1375° F. and 1475° F.), and must withstand the severe strains imposed by the difference in the thermal expansion of the different metals joined thereby when the composite product is heated and cooled rapidly through large temperature ranges. Futher, the bond must withstand the strains involved in severe mechanical working of the product. The difficulty of producing a bond that will hold firmly under these conditions is complicated by the fact that the beryllium-copper alloy may not safely be heated to a temperature appreciably above 1475° F. At higher temperatures the alloy undergoes substantial grain growth that impairs its physical properties and prevents securing the full advantages of subsequent precipitation-hardening; and it begins to melt at a little above 1500° F. Hence joining of the beryllium-copper to the cladding metal may not be effected by a solder that becomes molten only at temperatures above the maximum heat treatment temperatures. The bond must be formed at a temperature not higher than 1475° F., but once formed it must withstand reheating to the temperature at which it was formed, or even higher, without parting.

As a result of an extensive investigation on this subject, I have discovered that a satisfactory bond may be produced by the use of a solder (advantageously a silver solder) having a flow point below 1475° F. but above 1100° F. and preferably above 1300° F., if the soldering operation is controlled so as to effect complete conversion of the solder alloy, by diffusion with the adjacent metals, to an alloy having a melting point above its original flow point and above 1350° F., and advantageously even above 1500° F. The term "flow point" means the temperature at which the solder alloy is completely melted, whereas the term "melting point" means the temperature at which the alloy first begins to become molten. In accordance with the invention, a film of the solder, with appropriate fluxes, is applied to a suitably prepared surface of a beryllium-copper alloy bar, and a sheet or bar of a cladding metal is also placed in contact with the silver solder. The assembly then is heated, under substantial pressure, to a temperature above the flow point of the solder, and preferably above about 1400° F., in the range between 1300° F. and 1475° F., and is held at such temperature for a long enough period of time to effect complete conversion of the solder by diffusion with the adjacent metals to an alloy having a melting point substantially above its original flow point and above 1350° F., and advantageously above 1500° F. In any event the alloy thus formed by diffusion must have a melting point above the solution-anneal temperature of the beryllium-copper.

I have further discovered that proper preparation of the surface of the beryllium-copper bar is of great importance in order to produce a truly satisfactory clad beryllium-copper product. In the first place, the surface to which the silver or other solder is applied must be substantially oxide-free. Beryllium oxidizes extremely readily, and its oxide is highly refractory and is not slagged off by any of the usual soldering fluxes. Moreover, it is important to prevent any metal which forms a eutectic with beryllium having a melting point much below 1500° F. from coming in direct contact with the beryllium-copper alloy. Gold, for example, forms a low-melting point eutectic with beryllium and so must not come in contact with the beryllium-copper alloy during the soldering operation or subsequently. Otherwise incipient melting may occur at the bond and weaken it when the beryllium-copper is heated to its solution-anneal temperature.

Both of these needs are met in accordance with the invention by electroplating or otherwise applying to the surface of the beryllium-copper alloy bar a thin film of a metal (a) whose oxides are readily fluxed by ordinary soldering fluxes, (b) which has a melting point above 1350° F. and preferably upwards of about 1500° F., (c) through which beryllium does not readily diffuse, and (d) the eutectic of which with both copper and beryllium has a melting point above the solution-anneal temperature of the beryllium-copper alloy. The first two of these requirements are of importance generally, and the last two in special cases. Copper and nickel are metals that meet all these requirements, and accordingly a thin film of copper or nickel may be electroplated or otherwise applied to the beryllium-copper alloy bar to form the surface to which the cladding metal is soldered. Silver, copper alloys such as brass, and nickel alloys such as cupronickel, may also be employed for this purpose.

Gold-clad beryllium-copper is a particularly advantageous product of the invention. Gold-cladding imparts to the product the color and appearance much in demand for jewelry and allied products, while the beryllium-copper may by heat treatment be given high strength and excellent spring properties not available in ordinary jewelry metals. However, gold alloys of the character ordinarily employed in the jewelry trade are likely to undergo recrystallization and substantial grain growth when heated to the high temperatures involved in the heat treatment of beryllium-copper. Such grain growth imparts an objectionable crystalline appearance and even a rough surface to the completed article—a defect commonly known as an "orange peel" effect. This defect may be overcome by employing a gold-cladding layer containing from 0.5% to 3% of nickel or cobalt, or both. Accordingly, the invention contemplates, in the manufacture of gold-clad beryllium-copper, the use of a gold-cladding alloy containing nickel or cobalt, or both, in an amount within the above-stated range.

The manufacture of a rolled composite strip of gold-clad beryllium-copper is described below by way of example to illustrate the invention. In the course of the description, reference is made to some of the modifications that may be made in the procedure specifically described; and novel features of the invention not particularly mentioned above are set forth. It is understood that the invention is not confined to the example specifically described, and that the novel features mentioned below are as much a part of the invention as are those briefly described above.

A suitable bar of beryllium-copper alloy is first treated to prepare its surface for bonding to a gold alloy cladding layer. A bar of the character known to the trade as a "plater's bar" is generally most satisfactory. Such a bar is usually about an inch thick, perhaps five inches wide, and about ten to eighteen inches long. The bar should, of course, be of a composition that may be precipitation hardened by the usual beryllium-copper heat treatment. The normal composition of the ordinary commercial beryllium-copper alloys is 2% to 2.25% beryllium, 0.5% max. nickel, 0.25% max. iron, and the balance copper. The beryllium may, however, range from 1% to about 3%, and minor quantities of other metals than those mentioned may be present.

The bar will usually be received from the metal supplier in the solution-annealed condition (that is, it has been heated to a temperature in the range from 1275° F. to 1475° F. and rapidly cooled to render it workable). The exposed surfaces of solution-annealed beryllium-copper are usually more or less oxidized, and oxidation products penetrate the grain boundaries to an appreciable depth below the surface. The first step is to remove these surface and intergranular deterioration products. This is best accomplished by mechanically cutting a surface layer of metal from the bar. The depth of cut should be sufficient to remove not only the visible surface oxides, but also such oxidation products as may penetrate the grain boundaries near the surface. A cut of at least 0.005 inch should be taken for this purpose, and a deeper cut up to 0.025 inch or more, may sometimes be indicated. The cut may be taken by grinding, shaping, milling or in any other suitable manner, and should be conducted so as to produce a substantially flat, smooth surface.

The bar is next prepared for electroplating a thin film of nickel or copper on the cut surface. It is imperative that the electroplated film adhere tenaciously to the beryllium-copper, and this in turn necessitates a scrupulously clean surface on the bar. A particularly satisfactory procedure for cleaning the bar immediately prior to plating involves first washing the bar in an alkaline cleaning and degreasing solution, and then washing in dilute hydrochloric acid, followed by rising in water. The cut surface of the bar is then scrubbed with pumice or other mild abrasive until no water-breaks form on it. By this I mean that when a film of clean water covers the scrubbed surface, it remains continuous and does not break up into globules of the character seen when a small amount of water is used to wet a greasy surface.

In some instances it is possible to dispense with one or more of the cleaning steps mentioned above. For example, it is occasionally possible to produce satisfactorily clean surfaces by scrubbing alone, without washing the bar in an alkaline cleaner followed by hydrochloric acid. Sometimes the scrubbing operation may be omitted, particularly if the bar is quite clean initially, and reliance may be placed on the alkaline cleaning solution and acid to produce an adequately clean surface. Generally it is best, however, to use the complete cleaning procedure outlined above. The mild abrasive action of pumice or the like during the course of the scrubbing operation roughens the surface lightly and improves the adherence of the subsequently applied electroplate.

Hydrochloric is the most satisfactory acid to employ in the above-described sequence of cleaning operations, although other acids may be employed. However, strongly oxidizing acids, such as nitric, should be avoided. The bar should not remain in the acid solution long enough for any substantial amount of metal to be dissolved, for the hydrogen then liberated is likely to penetrate into the metal and lead to a non-adhering electroplate.

In any event, after completion of the final step in the sequence of cleaning operations, the bar is kept wet with water until the plating bath is ready to receive it. I have found that if the bar, after cleaning, stands dry in the air for even a short while, enough oxide, dirt or similarly behaving contaminant collects on the surface to impair seriously the adherence of the subsequently applied electroplate. If the bar is kept wet, on the other hand, deleterious contaminants do not accumulate very rapidly; but even when the bar is kept wet, it is inadvisable to defer plating for more than a few hours after completion of the cleaning operations.

Plain, clean water is the most convenient medium with which to keep the cleaned surface of the bar wet between the cleaning and plating operation, but it is also possible to use a suitable water solution for this purpose. Thus, quite dilute hydrochloric acid solutions have been used with success.

The next step is to electroplate on the cleaned cut surface of the bar a thin film of copper, nickel or other metal or alloy having an easily fluxed oxide and an adequately high melting point (preferably above 1500° F.). The electroplated film is applied by the usual electroplating techniques. In the case of a copper electroplate applied from an acid electrolyte, it is particularly advantageous to subject the bar initially to a very low current density of about five to ten amperes per square foot. After the initial deposit of copper has been formed under these conditions, the current density may be increased to twenty to twenty-five amperes per square foot. Alternative to operating initially at a low current density in an acid electrolyte, a flash deposit of copper may be applied by electrolysis in a cyanide plating bath, after which the copper electroplate may be built up to final thickness in an acid bath at a fairly high current density.

If a nickel electroplate is applied in place of copper, using an acid electrolyte, it is advantageous to follow substantially the same procedure described above, that is, to operate initially at a low current density and to raise the current density to the final value only after an initial thin deposit has been formed on the bar.

Initial operation at low current density, or, in the case of copper, initial application of a flash electroplate from a cyanide plating bath, produces a much more adherent deposit on beryllium-copper than can be obtained if the plating operation commences at a high current density.

While copper and nickel are specifically mentioned as the metals composing the film applied to the prepared surface of the beryllium-copper bar, and while these are in fact the preferred metals to employ, it is possible to use some other metal instead, as indicated above. For example, an electroplate of silver may sometimes be substituted for the copper or nickel film. Electroplates of brass, bronze and copper-nickel alloys may also be applied.

Application of the copper, nickel, or other metal film by electroplating is generally preferred because it does not require any particularly elaborate apparatus and has been found to give very satisfactory results, but other methods of application are feasible. For example, a thin film of the chosen metal may be applied by sputtering or evaporation in vacuum.

The bar with its electroplated film of copper or other metal is prepared for application of the cladding metal by grinding or sanding the electroplate on the cut surface of the bar. This grinding or sanding operation serves several purposes. It insures a flat but lightly roughened surface that is eminently satisfactory to receive the solder. If, as is best, the sanding or grinding is performed just prior to soldering metal in place, it serves to remove the dirt and oxides that will have accumulated on the bar if any substantial time has elapsed since completion of the electroplating operation. Finally, it serves to reduce the thickness of the copper or other electroplate to the optimum value. A film at least about 0.0005 inch in thickness should remain on the bar after sanding, but the thickness should not exceed about 0.004 or 0.005 inch. A film whose thickness is in the lower part of this range is generally sufficient to prevent the gold of the cladding layer from diffusing into contact with the beryllium of the beryllium-copper alloy and forming localized cores of low-melting eutectic, which would impair the quality of the bond between the beryllium-copper and the gold cladding metal. On the other hand, a copper or other film thickness greater than about 0.005 inch is likely to lead to a weakened bond, because the electrodeposited metal has rather low physical strength.

The bar, after sanding or grinding the electroplate on its cut surface, is ready for being soldered to a sheet of gold alloy or other cladding metal. This operation is best carried out as follows: The prepared surface of the bar is coated with a suitable flux, such, for example, as a hot solution of boric acid. A thin sheet of silver (or other metal) solder, also advantageously flux-coated, is laid over the surface of the bar, and a flux-coated sheet of gold alloy is then laid over the sheet of silver solder, thus forming a sandwich of the silver solder between the beryllium-copper bar and the gold.

The solder should be one having an initial melting point and a flow point between 1100° F. and 1450° F., and preferably it should have its initial melting point and flow point between 1300° F. to 1450° F. In addition, it must be able to diffuse readily at the soldering temperature with one or both of the adjacent metals, so as to form therewith an alloy having a melting point above 1350° F. and advantageously upwards of 1450° F. or even 1500° F. Since silver and silver alloys diffuse readily with the usual karat-gold alloys, and form adequately high-melting alloys, such solders are preferred for use in making gold-clad beryllium-copper. The diffusion alloy formed by the solder with the adjacent metals must be sufficiently ductile to be worked extensively and to withstand the strains imposed upon it by differences in the work-hardening characteristics and the different thermal co-efficients of expansion of the metals which it unites. The properties of many silver solder alloys meet all of these requirements very well, provided they do not contain a high percentage of such low-melting point metals as zinc, tin and antimony. A silver solder that has been used successfully is composed of 64% silver, 30% copper, 5% zinc and 1% tin. This solder has an initial melting point at about 1340° F. and a flow point at about 1425° F. The percentage of tin and zinc which it contains is not high enough to be detrimental. Another solder that can be used with advantage is the eutectic alloy of copper and silver, composed of about 28% copper and the balance silver. This alloy melts sharply at about 1430° F. Other silver solders having the required melting characteristics and the required physical properties are available and may be used.

It is advantageous to sand the sheet of silver solder just before it is sandwiched between the beryllium-copper and gold layers. In this way surface dirt and oxides that would interfere with obtaining a good soldered joint are for the most part removed. The sheet of silver solder used need not, and preferably should not be very thick. A solder sheet about .003 inch in thickness is generally satisfactory, although it may be somewhat thinner or thicker.

The gold alloy used for cladding should be of such composition that it will not be deleteriously affected by the high temperature to which it is subjected during soldering and subsequently during heat treatment of the beryllium-copper. In the case of gold-clad beryllium-copper alloys prepared to have an ornamental gold surface, it is desirable to employ an alloy which does not undergo coarse grain growth when heated to the soldering or solution-anneal temperatures. Many karat-gold alloys upon being heated to or above their respective recrystallization temperatures (which usually are well below the solution-anneal temperature of beryllium-copper) undergo coarse grain growth, but gold alloys containing 0.5% to 3% of nickel or cobalt as a grain growth inhibitor are not subject to this defect, and hence may be used with advantage. The presence of these ingredients in the gold alloy is not essential if the characteristics of the alloy without them are satisfactory for the intended purpose. A typical twelve-karat yellow gold alloy that may be used with advantage is composed of about 50% gold, 30 to 40% copper, 5 to 12% silver, 4 to 15% zinc, and ½ to 3% of nickel or cobalt, or both. A satisfactory fourteen-karat yellow gold alloy is composed of about 58.3% gold, 25 to 30% copper, 8 to 12% silver, 2 to 10% zinc, and ½ to 3% of nickel or cobalt, or both.

It is desirable in some cases to use a precipitation hardenable gold alloy as the cladding metal. By using an alloy of this character that becomes hardened when subjected to the same heat treatment procedure as employed for hardening the beryllium-copper, it is possible to produce a gold-clad product on which the gold-cladding layer is particularly well able to resist wear due to frequent handling. Typical precipitation hardenable gold alloy compositions suitable for use as the cladding layer are set forth in the following table:

|  | 18-Karat White Gold | 14-Karat Yellow Gold | 14-Karat Yellow-Green Gold | 14-Karat Green Gold |
|---|---|---|---|---|
|  | Percent | Percent | Percent | Percent |
| Gold | 75 | 58.3 | 58.3 | 58.3 |
| Silver |  | 11.0 | 20.85 | 30.0 |
| Copper | 3.5 | 26.4 | 20.85 | 6.0 |
| Nickel | 16.5 | 2.0 |  | 1.5 |
| Zinc | 5.0 | 2.3 |  | 4.2 |

The foregoing alloys become solution-annealed at about the same temperature employed for solution-annealing beryllium-copper (1275° F. to 1475° F.), and precipitation harden at about the same reheating temperature at which beryllium-copper precipitation hardens (500° F. to 700° F.). Hence a single heat treatment suffices to harden both the gold alloy and the beryllium-copper of a clad metal product on which these alloys are used as the cladding layer. If the gold-cladding alloy is of such composition that it requires somewhat different solution-anneal and reheating temperatures than the beryllium-copper, it is often possible to compromise the heat treatment procedure, using temperatures that are not optimum for either the beryllium-copper or the gold alloy, but that impart useful and adequate hardening to both constituents of the clad product.

The particular gold alloys set forth above are mentioned only by way of example. Other gold alloys may also be employed in making the new clad product.

As in the case of the silver solder and the electroplated beryllium-copper, it is advantageous to sand or grind the surface of the gold alloy sheet just before making it into the sandwich, in order to remove such surface dirt and other contaminants as would be likely to impair the quality of the soldered bond.

After the sandwich of beryllium-copper, silver solder, and gold has been prepared, a layer of asbestos paper or other refractory material having low-heat conductivity is applied over the gold. The amount of asbestos paper used depends on the thickness of the gold alloy and on the melting point of the solder, as its purpose is to prevent, during soldering, having the solder heated to its melting point by heat conducted through the gold before the entire mass of the beryllium-copper bar has been brought to the soldering temperature.

The sandwich, now ready for the soldering operation itself, is compressed between steel plates and heated to the soldering temperature. One conventional plater's furnace technique for soldering involves clamping the sandwich between backing plates of steel by means of heavy clamps, placing the assembly in a furnace, and heating to the proper temperature. While this soldering procedure may be followed, it is more advantageous to insert the sandwich between massive uniformly pre-heated platens. One of the platens preferably is arranged so that it can be forced toward the other platen and so compress the sandwich between them without the use of clamps.

At least two advantages are secured by this latter method of soldering. In the first place, the use of pre-heated platens permits the soldering operation to be completed much more rapidly than if heavy steel backing plates must be heated along with the sandwich. In the second place, elimination of the clamps that are necessary to hold the sandwich between the backing plates in the clamp-type plater's furnace enables the sandwich to be heated uniformly to the soldering temperature. When clamps are employed for holding the assembly together in the furnace, they must be quite heavy, and because of their mass they cause the sandwich to be heated more slowly in the regions of the clamps than in the regions between clamps. Such uneven heating is disadvantageous because the parts of the sandwich that are heated more rapidly may became overheated before the more slowly heated sections reach the flow point of the solder. As indicated above, overheating of the beryllium-copper must be avoided.

The sandwich between massive uniformly pre-heated platens is quite rapidly brought to the flow point of the solder, largely by heat conducted from the platens through the gold and through the beryllium-copper bar. It is important that the entire mass of the beryllium-copper bar be heated uniformly to a temperature in the range from 1275° F. to 1475° F. and preferably in the range from 1375° F. to 1475° F. during soldering, so that it will be in the solution-annealed condition at the completion of the soldering operation. The asbestos paper (or equivalent heat insulation layer) laid over the gold layer before introduction of the sandwich into the furnace, and which retards the rate of heat flow from one platen through the gold to the solder alloy, serves the important function of preventing the solder from reaching its melting temperature much if at all before the beryllium-copper bar is uniformly heated to that temperature. Thus excessive diffusion-alloying of the metals in the region of the solder bond is prevented. Excessive diffusion-alloying can result in complete consumption of the copper or nickel electroplate, and enable low-melting cores of gold-beryllium eutectic to form in the region of the bond.

The asbestos paper (or equivalent heat insulation) should not be so thick that the gold layer is prevented from reaching the soldering temperature until substantially after the beryllium-copper has done so. Too-thick asbestos may result in overheating the beryllium-copper before adequate diffusion of the solder alloy with the adjacent metal has occurred. The ideal asbestos thickness is that which enables the gold alloy adjacent the solder to reach the soldering and diffusion temperature at just about the same time that the beryllium-copper near the solder reaches this temperature.

The sandwich is held between the platens in the furnace for a sufficient period of time after the solder has melted to insure heating the entire mass of beryllium-copper to between 1300° F. and 1475° F., and to permit the solder to inter-diffuse with the adjacent gold layer and the electroplated copper film and form therewith an alloy having a melting temperature above 1350° F. and preferably upwards of 1500° F. The amount of time required for this diffusion to occur is not long if the initial melting point of the silver solder is above 1300° F. and the cladding metal is gold. In this case a diffusion time of the order of one or two minutes after the solder has reached its flow point is usually sufficient. If the initial melting temperature of the solder is much below 1300° F., however, or if the solder does not diffuse readily with the adjacent metal, a somewhat longer diffusion time may have to be allowed.

Beryllium and gold form a eutectic having a melting temperature in the general neighborhood of 1000° F., and if these two constituents of the clad metal product diffuse into contact during soldering or during subsequent heat treatment, small cores of this low-melting eutectic may develop and weaken the bond between the cladding layer and the base metal. Accordingly, a thin film of the copper or other electroplate, unmodified by diffusion, should remain between the cladding layer and the beryllium-copper alloy, even after the soldering operation has been completed. The rate of diffusion of both beryllium and gold with both copper and nickel is sufficiently low so that only a very thin copper or nickel film is necessary, provided the soldering operation is properly and carefully carried out.

Because it is generally advantageous for at least a part of the thickness of the original film of copper or nickel electroplate to remain intact after completion of the soldering, the time allowed for diffusion should be correlated with the initial thickness of the electroplate and the diffusion characteristics of the metals employed so that there will be no substantial areas where the diffusion has modified the composition of the electroplate throughout its entire thickness. The use of asbestos paper, as described above, is helpful in preventing such an occurrence during the soldering operation when the cladding layer is thin compared to the beryllium-copper bar.

During the entire course of the soldering operation, the sandwich is kept under considerable pressure between the heated platens. After the solder has melted, the excess oozes out as a bead around the edges of the bar. The first appearance of this bead, indicating that the solder has reached its flow point, may be taken as a reference point in time for judging the length of the time interval to be allowed for the proper amount of diffusion to take place.

Upon completion of the soldering operation, the beryllium-copper bar has been uniformly heated to its solution-annealing temperature between 1300° F. and 1475° F. To hold the beryllium in solid solution, the bar should be rapidly cooled, and cooling should be effected so as not to injure the freshly formed soldered joint. The most satisfactory way in which to effect this rapid cooling is to transfer the sandwich, upon completion of the soldering operation, from between the heated furnace platens to between a pair of massive relatively cold metal plates, and to compress it therebetween. The sandwich cools rapidly under these conditions by conduction of heat to the cold platens, which are massive enough to absorb a large quantity of heat from the soldered assembly. Since the sandwich is compressed between the cold platens during this period of cooling, the soldered joint remains intact.

It is not necessary that the soldered assembly be cooled all the way to room temperature while compressed between the cold platens. It is sufficient if the assembly is held between the platens only until it has reached a temperature in the range from 700° F. to 1000° F. The assembly then may be taken from between the cooling platens and may be quenched to room temperature in water or other suitable medium. In fact, it is advantageous to conduct the cooling in this fashion, because there is then minimum opportunity for any of the beryllium in solid solution to precipitate and cause hardening of the beryllium-copper alloy. Initial cooling between the platens proceeds quite rapidly, but final cooling from about 800° F. to room temperature proceeds more and more slowly. Since the precipitation-hardening temperature for the beryllium-copper alloy is generally between 500° F. and 700° F., it is advantageous to conduct the cooling in the two steps described above, so that the beryllium-copper will not remain at a temperature between 500° F. and 700° F. any longer than is necessary.

When the soldered assembly has been cooled to room temperature, it is ready for reduction to final thickness by rolling. Before rolling, it may be advantageous to pickle the assembly in acid, to remove the bulk of the oxides that have formed on the exposed surface of the beryllium-copper during soldering and during the initial cooling in air between cold platens. Such pickling, however, is not always necessary.

Rolling the bar to final thickness is carried out in the usual manner. The bar generally may be reduced 50% or more in thickness before the beryllium-copper has work-hardened to the point that it must be annealed before being rolled further. Such annealing is conducted in the usual manner for beryllium-copper. It may in each case be effected by heating the bar to the solution-anneal temperature between 1375° F. and 1475° F., and then quenching to room temperature. An alternative annealing procedure involving heating to a temperature of about 900° F. to 1050° F. for a period of several hours is sometimes preferable. This alternative annealing procedure (essentially an over-aging treatment), since it does not require heating to so high a temperature, may be carried out with minimum danger of weakening the soldered joint between the beryllium-copper and the cladding layer of gold alloy. However, after a series of rolling operations and intermediate anneals have brought the bar to its final thickness, it is necessary to perform a final solution-anneal by heating to 1275° F. to 1475° F. (preferably 1375° F. to 1475° F.) and quenching. This is because the metal in the over-aged condition cannot be precipitation hardened; it must be solution-annealed before it will respond to precipitation-hardening treatment.

Fig. 1 of the drawings illustrates diagrammatically in cross section, on a scale that has been distorted for purposes of clarity, a clad berryllium-copper product prepared as described above.

Figure 2:
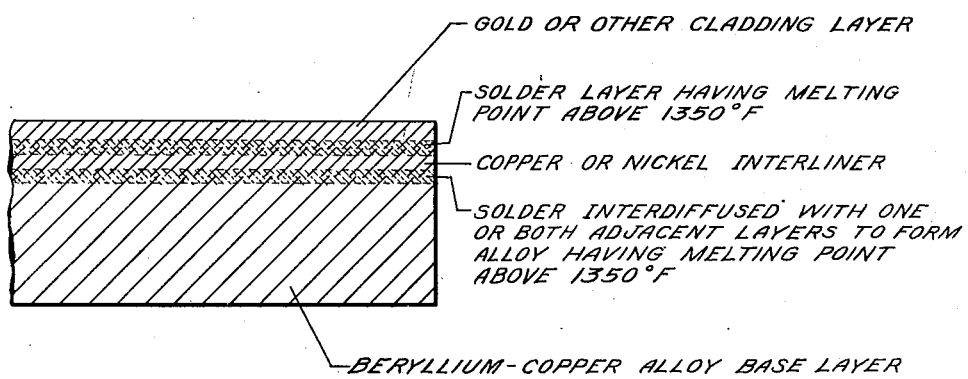

The exemplary procedure described above for making gold-clad beryllium-copper involves applying the gold-cladding layer directly to the copper- or other metal-plated beryllium-copper bar. An alternative procedure that may be employed with success involves first making a master plate of gold and a base metal (interliner) such as copper, nickel, brass, or the like. Such a master plate may be made in accordance with well-known cladding procedures by soldering a sheet of gold to a sheet of say copper, preferably using a silver solder having a melting point upwards of 1450° F. In any event, the solder, and the other constituents of the master plate as well, should have a melting point above 1350° F. The master plate usually is made quite thick, with approximately equal thicknesses of gold and base metal (say with ¼ inch gold and ¼ inch base metal). It is then reduced by rolling to the desired thickness (say 1/16 inch) for cladding purposes. The rolled master plate is soldered to a beryllium-copper bar, following substantially the procedure described above. While this method of making the clad product involves the extra step of first making the master plate, it has the advantage that a relatively thick layer of copper or other base metal interliner separates the gold from the beryllium copper, and minimizes any possibility that cores of low melting gold-beryllium eutectic will be formed during soldering, or subsequently during annealing. Since the interliner has the good physical properties of rolled metal, it may be much thicker than electroplate on the beryllium-copper bar without reducing the strength of the product at the bond. A clad metal product prepared in accordance with this alternative procedure is shown diagrammatically in Fig. 2.

Still another procedure that can be followed, and that leads to a product similar to that prepared using a master plate, is carried out as follows: A sandwich is prepared by applying a sheet of solder having a flow point between 1100° F. and 1450° F. to the prepared surface of the beryllium-copper bar, then applying a layer of copper, nickel, silver, brass or other metal as an interliner (the interliner should have a melting point above 1350° F.), applying over this layer a second sheet of solder (which, like the first solder layer, should have a melting point between 1100° F. and 1450° F.), and finally applying the layer of gold or other cladding metal. The thus prepared sandwich is then subjected to the soldering procedure described above (at a temperature between 1275° F. and 1475° F. that is above the flow point of both solders but below the melting point of any other constituent of the sandwich) to unite the gold to the interliner and the interliner to the beryllium-copper. The soldering operation is so conducted that both solder layers form, by diffusion with the adjacent metal, alloys having melting points above the original flow points of the solders and above 1350° F., and advantageously above 1500° F., so that the resulting product may subsequently be heated to the solution-anneal temperature of the beryllium-copper without weakening the soldered bond. This product also is of the character shown in Fig. 2.

Rolled strip of gold-clad beryllium-copper prepared as described above is a highly useful material for the jewelry and allied trades. The gold cladding presents the attractive appearance that is much sought in articles for personal adornment and kindred items. The strip in the solution-annealed condition is easily worked into intricate shapes, and after working, may be hardened greatly and given valuable spring properties by reheating for several hours at 500° F. to 700° F. and then cooling.

While numerous articles may be made from gold-clad beryllium-copper strip, one such product that may be mentioned specifically by way of example is the pocket clip with which pencils and fountain pens are usually provided. The manufacture of such clips involves severe working of the metal, and the finished product must possess good spring properties. Heretofore it has been necessary to make such clips from hard-rolled gold-clad phosphor bronze or similar strip. A hard-rolled strip was necessary, because work-hardening is the only way in which such materials may be given satisfactory spring properties. The hard-rolled material, however, is difficult to fabricate into even relatively simple shapes, and the severe working that is necessary, for example, to form a ball-end on the clip can be accomplished only after very painstaking spot-annealing of the metal, conducted so as not to anneal that part of the clip which must be springy.

With gold-clad beryllium-copper prepared as herein described, the clip is easily fabricated while the metal is in the soft solution-annealed condition. Thereafter it may be precipitation-hardened in the manner described to impart spring properties even superior to what may be attained in work-hardened Phosphor bronzes and similar metals.

While the invention has been described specifically with reference to the manufacture of a rolled strip of gold-clad beryllium-copper, the features of the invention are equally applicable to making other clad beryllium-copper products. For example, it is not essential that the cladding metal be gold. Other precious metals, such as silver and platinum, and base metals, such as copper, nickel, iron alloys, etc., may be applied as the cladding metal to, or as the second layer of a bimetal with, beryllium-copper alloy. Silver-clad beryllium-copper, for example, may be made substantially as herein described, simply by substituting a silver or silver alloy cladding layer for gold. A copper-clad beryllium-copper alloy may be similarly prepared, using if desired, a brass or bronze brazing alloy in place of a silver-soldering alloy for uniting the cladding layer with the beryllium copper.

Bimetals or clad metals of silver or copper with beryllium-copper alloy may be used with advantage in the manufacture of components for electrical equipment which requires the high conductivity of silver or copper, in conjunction with the good spring properties that may be imparted to the beryllium-copper by heat treatment. Bimetals of soft iron or an iron alloy with beryllium-copper alloy have utility, for example, where a combination of magnetic and spring properties are desired, as in armatures for certain types of electrical relays. Beryllium-copper clad with nickel or nickel silver (an alloy of copper, zinc and nickel) in accordance with the invention has proved to be a valuable material for many industrial uses.

Other shapes than the singly-clad rolled strip specifically described above may be made in accordance with the invention. Such products as those known to the trade as edgelay, inlay and centerlay composite metals, having a beryllium-copper alloy component, may be made in accordance with the invention substantially as described above. Beryllium-copper having an edgelay of silver, for example, is particularly useful for fabricating electrical spring contact elements.

It is also possible, in accordance with the invention, to apply a cladding layer of gold or other metal to a round rod of beryllium-copper, which may be drawn into the form of gold-clad beryllium-copper alloy wire; and similarly wires having a beryllium-copper core and some other cladding layer than gold may be prepared. Such wires may be used for manufacturing springs and similar articles requiring the physical properties that may be developed by heat treatment of the beryllium-copper core in connection with the appearance of a gold-cladding layer, the electrical conductivity of a silver or copper cladding layer, etc.

I claim:

1. The method of manufacturing clad beryllium-copper which comprises applying to a substantially oxide-free surface of a bar of beryllium-copper a coating of a metal (a) having a melting point above 1350° F., (b) through which beryllium does not readily diffuse, (c) the eutectic of which with beryllium has a melting point above 1350° F., and (d) the oxide of which is easily fluxed, sandwiching a solder having a flow point between 1100° F. and 1450° F. between said coating and a layer of cladding metal, and substantially uniformly heating the sandwich at a temperature above the flow point of the solder, but below 1475° F., and under substantial pressure for a sufficient period of time to affect complete conversion of the solder by diffusion with the adjacent metals to an alloy having a melting temperature substantially above the initial flow point of the solder and above about 1350° F., the duration of the heating being such that there is no substantial area where diffusion has modified the composition of the coating metal throughout its entire thickness.

2. The method of manufacturing clad beryllium-copper as set forth in claim 1 in which the coating is a metal from the group consisting of copper and nickel and the alloy obtained by conversion of the solder with adjacent metals has a melting point above about 1500° F.

3. The method of manufacturing clad beryllium-copper as set forth in claim 1 in which the solder is a silver solder.

4. The method of manufacturing clad beryllium-copper as set forth in claim 1 in which the cladding metal is a gold alloy inhibited against coarse-grain growth at temperatures up to about 1500° F.

5. The method of manufacturing clad beryllium-copper as set forth in claim 1 in which the cladding metal is a gold alloy containing from 0.5% to 3% of a metal selected from the group consisting of nickel and cobalt and is inhibited against coarse-grain growth at temperatures up to about 1500° F.

6. The method of manufacturing clad beryllium-copper as set forth in claim 1 in which the clad beryllium-copper is rapidly cooled after the heating thereof.

7. The method of manufacturing clad beryllium-copper as set forth in claim 1 in which the coating is less than 0.005 inch thick and is electrodeposited on the beryllium-copper.

8. The method of manufacturing clad beryllium-copper as set forth in claim 1 in which the surface of the beryllium-copper onto which the coating is applied is preliminarily treated to form a fresh surface by removing therefrom sufficient metal to remove surface oxides and such intergranular deterioration products as are normally present near the surface of annealed beryllium-copper.

9. The method of manufacturing clad beryllium-copper as set forth in claim 1 in which, during the heating, the sandwich is pressed between relatively-massive, uniformly-heated platens.

10. The method of manufacturing clad beryllium-copper as set forth in claim 1 in which material of low heat conductivity is placed over the surface of the cladding metal and the heating is obtained by placing the resulting assembly between relatively-massive, uniformly-heated platens which are pressed against it.

11. The method of manufacturing clad beryllium-copper as set forth in claim 1 in which the clad beryllium-copper is rapidly cooled by inserting it, while still hot, between a pair of relatively-massive and relatively-cold metal platens and compressing the clad beryllium-cooper therebetween until it has cooled to a temperature of from 700° F. to 1000° F., and in which the clad beryllium-cooper is then removed from between the platens and quenched to near room temperature.

12. The method of manufacturing clad beryllium-cooper as set forth in claim 1 in which the coating is an electrodeposited one less than about 0.005 inch thick of a metal from the class consisting of cooper and nickel, the electrodeposited coating is ground to a flat surface and the cladding metal is a precious one.

13. The method of gold cladding beryllium-copper which comprises preparing a relatively-thick masterplate by soldering a layer of gold alloy to a base interliner metal (a) through which beryllium does not readily diffuse, (b) the eutectic of which with beryllium has a melting point above 1350° F., and (c) the oxide of which is easily fluxed, the solder, gold alloy and interliner metal all having melting points above 1350° F., rolling the resulting masterplate to a desired thickness, sandwiching a second solder having a flow point between 1100° F. and 1400° F. between the interliner face of the rolled masterplate and a substantially oxide-free surface of a bar of beryllium-copper, and heating the sandwich while under substantial pressure at a temperature above the flow point of said second solder but below the melting temperature of any component of the masterplate and below about 1475° F. for a sufficient period of time to affect complete conversion of said second solder by diffusion with adjacent metals to an alloy having a melting temperature substantially above its original flow point and above 1350° F., the heating being such that there is no substantial area where diffusion has modified the composition of the base interliner metal throughout its entire area.

14. The method of manufacturing gold clad beryllium-copper which comprises preparing a sandwich comprising a bar of beryllium-copper having a substantially oxide-free surface, a sheet of solder having a flow point between 1100° F. and 1400° F., a base interliner metal (a) having a melting point above 1350° F., (b) through which beryllium does not readily diffuse, (c) the eutectic of which with beryllium has a melting point above 1350° F., and (d) the oxide of which is easily fluxed, a second sheet of solder having a flow point between 1100° F. and 1400° F. and a gold alloy cladding sheet, heating the resulting sandwich under substantial pressure at a temperature above the flow points of the solders but below the melting temperature of any other component of the sandwich and below 1475° F. for a sufficient period of time to convert the solder by diffusion with adjacent metal to alloys having melting temperatures substantially above their original flow points and above 1350° F., the heating being such that there is no substantial area where diffusion has modified the composition of the base interliner metal throughout its entire area.

15. Solution-annealable composite metal stock comprising a base of beryllium-copper, a layer of an interliner metal having one face bonded to the beryllium-copper base, said interliner metal being one (a) having a melting point above 1350° F., (b) through which beryllium does not readily diffuse, (c) the eutectic of which with beryllium has a melting point above 1350° F., and (d) the oxide of which is easily fluxed, and a layer of cladding metal secured to the opposite face of the layer of interliner metal, the interfacial portions only of the interliner metal and the cladding metal having interdiffused therein the metal components of a silver solder having a flow point between 1100° F. and 1450° F. and forming therewith interfacial alloys having a melting point above the solution-anneal temperature of the beryllium-copper, whereby a portion of the interliner metal unmodified by diffusion separates the cladding metal from the beryllium-copper base.

16. Solution-annealable composite metal stock comprising a base of beryllium-copper, a layer of an interliner metal having one face bonded to the beryllium-copper base, said interliner metal being one (a) having a melting point above 1350° F., (b) through which beryllium does not readily diffuse, (c) the eutectic of which with beryllium has a melting point above 1350° F., and (d) the oxide of which is easily fluxed, and a layer of cladding metal secured to the opposite face of the layer of interliner metal, the interfacial portions only of the interliner metal and the cladding metal having interdiffused therein the metal components of a silver solder having a flow point between 1100° F. and 1450° F. and forming therewith interfacial alloys having a melting point above about 1350° F., whereby a portion of the interliner metal unmodified by diffusion separates the cladding metal from the beryllium-copper base.

17. Composite metal stock as set forth in claim 16 in which the cladding metal is a gold alloy.

18. Composite metal stock as set forth in claim 16 in which the cladding metal stock is a gold alloy containing from about 0.5% to 3% of a metal selected from the group consisting of nickel and cobalt.

19. Composite metal stock as set forth in claim 16 in which the interliner metal is a metal from the group consisting of copper and nickel.

20. Solution-annealable composite metal stock comprising in the order named a base of beryllium-copper, a layer of a metal (a) having a melting point above 1350° F., (b) through which beryllium does not readily diffuse, (c) the eutectic of which with beryllium has a melting point above 1350° F., and (d) the oxide of which is easily fluxed, a layer of an alloy of said metal with the metal components of a silver solder having a flow point between 1100° F. and 1450° F., a layer of a gold alloy containing the metal components of the same silver solder, and a layer of the same gold alloy without the components of the silver solder, the layers of the alloys containing the components of the silver solder having a melting point above the solution-anneal temperature of the beryllium-copper, said layers and the base being bonded together.

21. Composite metal stock as set forth in claim 16 in which the cladding metal is a precipitation-hardenable gold alloy.

VICTOR G. MOORADIAN.

(References on following page)

REFERENCES CITED

The following references are of record in the file of this patent:

UNITED STATES PATENTS

| Number | Name | Date |
|---|---|---|
| 1,904,241 | Kammerer | Apr. 18, 1933 |
| 1,959,925 | Pryde | May 22, 1934 |
| 2,024,150 | Davignon | Dec. 17, 1935 |
| 2,139,215 | Wasson | Dec. 6, 1938 |
| 2,223,046 | Peterson | Nov. 26, 1940 |
| 2,233,928 | Weaver | Mar. 4, 1941 |
| 2,257,535 | Rohn | Sept. 30, 1941 |
| 2,284,504 | Wrighton | May 26, 1942 |
| 2,329,376 | Illmer | Sept. 14, 1943 |
| 2,392,917 | Guinee | Jan. 15, 1946 |
| 2,474,031 | Davignon | June 21, 1949 |
| 2,474,039 | Davignon | June 21, 1949 |

FOREIGN PATENTS

| Number | Country | Date |
|---|---|---|
| 492,327 | Germany | Feb. 21, 1930 |